3,008,955
PROCESS FOR THE RECOVERY OF 6-AMINOPENICILLANIC ACID

David A. Johnson and Glenn A. Hardcastle, Jr., Syracuse, N.Y., assignors, by mesne assignments, to Beecham Research Laboratories Ltd., Brentford, Middlesex, England, a corporation of Great Britain and Northern Ireland
No Drawing. Filed Aug. 3, 1959, Ser. No. 831,039
9 Claims. (Cl. 260—239.1)

This invention relates to a process which is useful in the recovery of 6-aminopenicillanic acid from aqueous solutions thereof and, more particularly, relates to the concentration of 6-aminopenicillanic acid in fermentation broths.

The recovery in a simple economic fashion and high yield of a water-soluble compound such as 6-aminopenicillanic acid from dilute aqueous solutions, including fermentation broths and ion exchange resin eluates, presents a difficult problem. Ordinary processes of extraction at various pH's are not satisfactory, and no satisfactory methods of precipitation are known which are effective when used on very dilute solutions. Recovery of 6-aminopenicillanic acid from fermentation broths is complicated by the presence in such broths of various impurities, including some penicillins, formed during the fermentation process, and by the difficulties encountered in causing 6-aminopenicillanic acid to be adsorbed on and eluted from ion exchange resins.

The invention is broadly directed to an improved method for the recovery of 6-aminopenicillanic acid from dilute aqueous solutions thereof. It is a general object of the invention to provide a novel improved process for the separation and removal of 6-aminopenicillanic acid from fermentation broths in which such compound is produced. It is a particular object of the invention to provide a commercially useful method by which 6-aminopenicillanic acid in dilute aqueous solutions such as fermentation broths can be transferred in high yields to concentrated aqueous solutions which are substantially free of contaminants present in the fermentation broth. It is also an object of the invention to provide a process for extracting 6-aminopenicillanic acid from dilute aqueous solutions thereof into a lesser volume of an organic solvent. Another object of the invention is to provide a process for the recovery of 6-aminopenicillanic acid from dilute aqueous ion exchange resin eluates. Other objects and advantages of the invention will become apparent in the course of the following detailed description and illustration of the invention.

According to the present invention an aqueous solution of 6-aminopenicillanic acid is extracted at a pH of from about 1 to 3, preferably at a pH of from about 1.5 to 2.5 with a lesser volume of a substantially water-insoluble organic solvent of the class hereinafter defined, said organic solvent having dissolved therein at least about 0.5% and not more than about 10%, preferably from about 1% to about 5% by weight of said aqueous solution of an anionic surface active compound or mixture of compounds each having the formula $(RSO_3)_xM$ wherein M is a radical selected from the group consisting of hydrogen, the alkali metals and the alkaline earth metals, wherein $x$ is a whole number equal to the valence of M, and wherein R is a hydrocarbon radical having a molecular weight of at least about 340 and preferably from about 340 to about 425, said compound being soluble in organic solvents (of the class hereinafter described) and being substantially insoluble in water.

A preferred group of the class of compounds described above are the petroleum sulfonates and mixtures thereof selected from the group consisting of the compounds having the formula $(C_nH_{2n-10}SO_3)_xM$ wherein $n$ is a whole number greater than 25 and less than 32, M is a radical selected from the group consisting of hydrogen and the alkali metals and the alkaline earth metals, and $x$ is a whole number which is equal to the valence of M. Another preferred group of the class of oleophilic, hydrophobic compounds described above are the compounds and mixtures of the compounds having a molecular weight of from about 490 to 510 and having the formula $RSO_3Na$ wherein R is a monovalent unsaturated hydrocarbon radical having from about 28 to 30 carbon atoms.

The amount of such petroleum sulfonates used in the solvent extraction step of the process is at least 0.5 percent, and preferably from 1 to 5 percent, by weight of the starting aqueous solution from which the 6-aminopenicillanic acid is being extracted. While greater amounts may be used, we have found that no significant advantage is gained by using more than from about 5 to 10% of petroleum sulfonates by weight of the starting aqueous solution. Petroleum sulfonates are commercially available in the form of utilizable mixtures consisting essentially of about 62% petroleum sodium sulfonate, 33% mineral oil and 5% water; such a mixture is a convenient and practical means of supplying sulfonates to the solvent in the process of the present invention.

We have found that the organic solvents useful in the process of this invention can be any of the solvents selected from the group consisting of the substantially water-immiscible alcohols having the formula $$ROH$$

wherein R is an alkyl group having from 4 to 6 carbon atoms, the substantially water-immiscible esters having the formula $$R^1COOR^2$$

wherein $R^1$ and $R^2$ are each alkyl groups having from 1 to 6 carbon atoms and wherein the total number of carbon atoms in each of said esters is from 4 to 8 and the substantially water-immiscible ketones having the formula $$\underset{\underset{O}{\|}}{R^3CR^4}$$

wherein $R^3$ and $R^4$ are each alkyl groups having from 1 to 6 carbon atoms and wherein the total number of carbon atoms in each of said ketones is from 4 to 8, and the substantially water-immiscible ethers of the formula $$R^5-O-R^6$$

wherein $R^5$ and $R^6$ are each alkyl groups having from 3 to 6 carbon atoms. The preferred organic solvents which are useful in this process are methyl isobutyl ketone and n-butanol. We have found that substantially equivalent results are obtained by the use of either methyl isobutyl ketone or n-butanol. Additional examples of the solvents in group described above are butyl acetate, n-amyl acetate, isobutanol, n-amyl alcohol, isoamyl alcohol, diisopropyl ether, diamyl ether, ethyl isopropyl ketone, and ethyl t-butyl ketone, all of which can be used in the process, although the results obtained thereby are not as desirable as those obtained by the use of the preferred solvents.

In one embodiment of the invention, the organic solvent phase resulting from the process step decsribed above is extracted with a lesser volume, e.g., one-fifth volume, of water at a pH of about 5 to 8, preferably at a pH of from about 6.5 to 7.0, whereby a concentrated aqueous solution of 6-aminopenicillanic acid is obtained; 6-aminopenicillanic acid can be precipitated from this concentrated aqueous solution by known methods, e.g., those described in Belgian Patent No. 569,728 and by methods which are illustrated in the examples below.

In another embodiment of the present invention, 6-aminopenicillanic acid is precipitated directly from an organic solvent phase (which is ordinarily at a pH of about 2), resulting from the process steps described above by adjusting such solvent phase to a pH of about 3.5 to 5.5, preferably to a pH of about 4.0 to 4.5, by the addition to the solvent phase of cations which will associate with the petroleum sulfonate; this pH adjustment can conveniently be accomplished by the addition to the solvent phase of a minor portion of an aqueous solution of an alkali metal hydroxide or alkali earth metal hydroxide, e.g., sodium hydroxide, potassium hydroxide, barium hydroxide, or calcium hydroxide, or of an alkali metal or alkali earth metal salt of a lower aliphatic carboxylic acid, e.g., potassium ethylhexoate.

The quantity of 6-aminopenicillanic acid present in a crude solid or solution can be measured indirectly by means of a procedure in which the 6-aminopenicillanic acid in the solution or solid to be measured is reacted under standardized conditions with phenoxyacetyl chloride to produce phenoxymethylpenicillin (penicillin V); this process is termed "activation" of 6-aminopenicillanic acid. The activated 6-aminopenicillanic acid is then assayed by comparison of its effectiveness as an antibiotic with penicillin V. Accuracy of the bioassay is improved where all of the penicillins (formed contemporaneously with the 6-aminopenicillanic acid) in the crude solid or solution are removed before activation of the acid, either by extraction of the aqueous test solution at pH 2–3 with ⅓ volume of butanol or more conveniently, by maintaining the test solution at pH 2–2.5 for about ½ hour whereupon all acid-unstable penicillins are decomposed.

In the general procedure of performing this assay a measured aliquot (10 ml.) of test solution is made alkaline with an excess of added solid sodium bicarbonate, then chilled in ice and a measured volume of acetone-containing phenoxyacetyl chloride is added. The amount of phenoxyacetyl chloride is usually 0.2 ml. to a test tube. The reaction mixture is shaken in ice for 15 to 20 minutes, then extracted with ½ volume ether. The extracted aqueous solution is then assayed against a standard of penicillin G or penicillin V.

The following specific examples will serve to further illustrate the process of this invention.

Example 1

A whole fermentation broth is chilled, adjusted to pH 2 with sulfuric acid, mixed with 0.5% activated carbon, and filtered to provide 10 liters of filtered broth containing 400 mcg./ml. (by bioassay) of 6-aminopenicillanic acid. The filtered broth (at pH 2) is extracted countercurrently in two stages with a solvent mixture at pH 2 (adjusted to pH 2 with sulfuric acid) containing 5 liters of wet n-butanol and 800 gm. of Petroleum Sodium Sulfonate Mixture No. I. "Petroleum Sodium Sulfonate Mixture No. I" is a commercially available mixture having a Furol viscosity of about 175 and containing 62% by weight of petroleum sodium sulfonates having an average molecular weight of about 490 to about 510 and having the formula $RSO_3Na$ wherein R is an unsaturated hydrocarbon radical containing from about 28 to 31 carbon atoms; 33% by weight of mineral oil and 5% by weight of water. The 800 gm. portion of Petroleum Sodium Sulfonate Mixture No. I therefore contains 496 gm. of the petroleum sodium sulfonates described above, 264 gm. of mineral oil and 40 gm. of water; such a mixture is commercially available from L. Sonneborn Sons Inc. of Petrolia, Pennsylvania, under the trademark "Petronate CR." The resulting rich butanolic extract, containing 700 mcg./ml. of 6-aminopenicillanic acid, is adjusted to pH 6.5 with aqueous sodium hydroxide and is extracted countercurrently in two stages at pH 6.5 with 1000 ml. of water. The resulting aqueous extract is found to be a concentrated aqueous solution containing 3000 mcg./ml. of 6-aminopenicillanic acid (by bioassay). The butanolic phase can be recovered and reused in subsequent extraction steps.

When the solvent, n-butanol, employed in the above process is replaced by methyl isobutyl ketone, butyl acetate, and diisopropyl ether respectively, the process results in substantially the same concentration of 6-aminopenicillanic acid. The use of ammonium hydroxide, calcium hydroxide, or sodium bicarbonate in place of the sodium hydroxide in the foregoing process provides substantially similar results.

Example 2

Solid crude 6-aminopenicillanic acid is obtained from concentrated aqueous solutions thereof by the following procedures:

A. One liter of the rich aqueous solution of 6-aminopenicillanic acid resulting from the process of Example 1 above is extracted at pH 2 with 300 ml. of n-butanol containing 50 gms. of Petroleum Sodium Sulfonate Mixture No. I (31 gm. of petroleum sodium sulfonate, 3.1% by weight of the solution). The resulting rich butanolic extract is adjusted to pH 4.5 and stirred whereupon 1.5 gms. of 6-aminopenicillanic acid assaying 800 mcg./mg. by bioassay is precipitated and collected by filtration.

B. One liter of the rich aqueous solution resulting from the process of Example 1 above is adjusted to pH 2 and extracted with a solvent mixture at pH 2 containing 500 ml. n-butanol and 80 gm. of Petroleum Sodium Sulfonate Mixture No. I. The resulting rich butanolic extract is then adjusted to pH 7 and extracted with 50 ml. of water. The resulting aqueous extract is adjusted to pH 4 and stirred for 2 hours whereupon crystalline 6-aminopenicillanic acid is precipitated and collected by filtration. The resulting 6-aminopenicillanic acid weighed 1.0 gm. and has a potency of 700 mcg./mg. by bioassay.

C. One liter of the rich aqueous solution resulting from the process of Example 1 above is concentrated under vacuum at 30° C. to 100 ml. and acidified to pH 4 with hydrochloric acid whereupon 6-aminopenicillanic acid amounting to 3.0 gm. and having a potency of 500 mcg./mg. by bioassay is precipitated and collected by filtration.

Example 3

In the recrystallization of 6-aminopenicillanic acid, crude solids containing volatile solvents are mixed with sufficient water to make a thick slurry and the mixture is neutralized to pH 6.8–7.0 with concentrated sodium hydroxide solution. The neutralized mixture is then diluted with the minimum amount of water to dissolve the remaining solids. The total volume of the solution is kept to a volume not greater than 1 liter for each 100 gm. estimated dry weight of 6-aminopenicillanic acid in order to obtain maximum recovery of the product. To the solution is added activated charcoal (Darco KB) at a level of 1.6 gm./liter of solution and the mixture is stirred for 10–20 minutes and filtered. The clear filtrate is acidified slowly to pH 4.3–4.5 with concentrated hydrochloric acid. crystalline solids precipitate during the acidification. The acidic mixture is stirred for one-half hour (preferably in the cold) and the crystalline 6-aminopenicillanic acid collected by filtration. The crystals are washed first with a small quantity of slightly acidified water, then with a small amount of acetone and dried under vacuum at room temperature for several hours.

The recrystallized crystals of 6-aminopenicillanic acid are white or light tan, have a potency of 1000 mcg./mg. (by bioassay) and melt at 209–210° C. Recovery of 6-aminopenicillanic acid activity from crude crystals to recrystallized precipitate is ordinarily in excess of 90%.

Example 4

A whole fermentation broth containing 6-aminopenicillanic acid is chilled and filtered to provide 10 liters of filtered broth. The filtered broth is acidified to pH 2 with sulfuric acid and extracted countercurrently in two stages with a solvent mixture at pH 2 (adjusted to pH 2 with sulfuric acid) containing 5 liters of wet n-butanol and 800 gm. of Petroleum Sodium Sulfonate Mixture No. II. "Petroleum Sodium Sulfonate Mixture No. II" is a commercially available mixture having a Furol viscosity of about 125 and containing 62% by weight of petroleum sodium sulfonates having an average molecular weight of about 440 to about 470 and having the formula $RSO_3Na$ wherein R is an unsaturated hydrocarbon radical containing from about 25 to 28 carbon atoms; 33% by weight of mineral oil; and 5% by weight of water. The 800 gm. portion of Petroleum Sodium Sulfonate Mixture No. II therefore contains 496 gm. of the petroleum sodium sulfonates described above (5% by weight of the broth), 264 gm. of mineral oil and 40 gm. of water; such a mixture is commercially available from L. Sonneborn Sons Inc. of Petrolia, Pennsylvania, under the trademark "Petronate HL." The resulting rich butanolic extract is adjusted to pH 6.5 with aqueous sodium hydroxide and is extracted countercurrently in two stages at pH 6.5 with 1000 ml. of water. The resulting aqueous extract is found to be a concentrated aqueous solution of 6-aminopenicillanic acid. The butanolic phase containing the sulfonate can be recovered and reused in subsequent extraction steps.

When the solvent, n-butanol, employed in the above process is replaced by methyl isobutyl ketone, butyl acetate, chloroform and diisopropyl ether respectively, the process results in substantially the same concentration of 6-aminopenicillanic acid. The use of ammonium hydroxide, calcium hydroxide, or sodium bicarbonate in place of the sodium hydroxide in the foregoing process provides substantially similar results.

Example 5

500 ml. of a filtered broth having a potency of 290 mcg./ml. (by bioassay) of 6-aminopenicillanic acid is adjusted to pH 2 and extracted with a solution containing 125 ml. of n-butanol and 25 gm. of Petroleum Sodium Sulfonate Mixture No. II, (15.5 gm. of petroleum sodium sulfonate; 3.1% by weight of the broth) the solution being first adjusted to pH 2 with sulfuric acid. The spent aqueous broth is found to have a potency of 160 mcg./ml. The resulting butanolic extract, amounting to 110 ml. and having a potency of about 800 mcg./ml., is adjusted to pH 6.8 with an aqueous solution of sodium hydroxide and extracted with 25 ml. of water. The aqueous extract is found to have a potency of 2300 mcg./ml. of 6-aminopenicillanic acid.

In like experiments other mineral acids are used in the acidification step and other bases such as calcium hydroxide, sodium bicarbonate, potassium hydroxide, ammonium hydroxide, etc., are used in the second pH adjustment step, and like results are obtained. Similarly, like experiments demonstrate that other solvents such as methyl isobutyl ketone, butyl acetate and diisopropyl ether can be used in the foregoing process with substantially similar results.

Example 6

A 300 gal. portion of a filtered broth assaying 375 mcg./ml. by bioassay is adjusted to pH 2 with sulfuric acid. A solvent solution containing 90 gal. of wet n-butanol and 23 kg. of Petroleum Sodium Sulfonate Mixture No. I (1.25% petroleum sodium sulfonate by weight of the broth) is adjusted to pH 2 with sulfuric acid. The 300 gal. portion of filtered broth is then extracted countercurrently with the solvent solution using a Luwesta countercurrent extractor. The spent aqueous broth is found to contain 30 mcg./ml. of 6-aminopenicillanic acid by bioassay while the rich butanolic extract has a potency of 640 mcg./ml. The rich butanolic extract amounting to 69 gal., is then mixed with 10.35 gal. of water and the mixture is adjusted to pH 6.8 with 1250 ml. of a 50% solution of sodium hydroxide. The resulting mixture is separated into a spent butanolic phase having a potency of 230 mcg./ml. and a rich aqueous phase, amounting to 11 gal., having a potency of 2600 mcg./ml.

The rich aqueous solution of 6-aminopenicillanic acid can be further processed to yield crystalline 6-aminopenicillanic acid by the methods illustrated in Example 2 above or it can be used as is to produce phenoxymethyl penicillin as illustrated in Example 7 below.

Example 7

To a 2.5 liter portion of an aqueous solution of 6-aminopenicillanic acid, assaying about 700 mcg./ml. and prepared by the procedure of Example 6, is added 250 ml. of acetone containing 7.0 gm. of phenoxyacetyl chloride together with solid sodium bicarbonate in an amount sufficient to maintain the reaction mixture at a pH of from 7 to 7.5. The reaction mixture is maintained at a temperature of from 0° to 5° C. and stirred for about 1 hour. The reaction mixture is then washed with an equal volume of methyl isobutyl ketone to remove excess phenoxyacetyl chloride and any other extractable material. The washed reaction mixture is then acidified to pH 2 with hydrochloric acid and divided into 500 ml. portions.

Separate 500 ml. portions of the reaction mixture are extracted with methyl isobutyl ketone, chloroform and ethyl acetate, respectively, and the extracts so obtained are dried over magnesium sulfate. The penicillin V contained in each extract is precipitated as the potassium salt by the addition to each solution of 1.1 equivalents (of the penicillin) of potassium ethylhexanoate in a butanol solvent. The crude penicillin V in each of the methyl isobutyl ketone, chloroform and ethyl acetate extracts is collected by filtration, air dried and found to amount to 2.60 gm., 1.28 gm. and 2.08 gm. respectively.

In a similar experiment a 100 ml. portion of a rich aqueous concentrate obtained by the method of Example 6 and assaying about 1900 mcg./ml. of 6-aminopenicillanic acid is reacted with .0001 mole of phenoxyacetyl chloride in acetone and 220 mg. of potassium phenoxymethyl penicillin is recovered.

Example 8

A 500 ml. portion of a filtered broth having a potency of about 300 mcg./ml. (by bioassay) of 6-aminopenicillanic acid is adjusted to pH 2 with hydrochloric acid and extracted counter-currently in three stages with a solution containing 125 ml. of methyl isobutyl ketone and 18 gm. of Petroleum Sodium Sulfonate Mixture No. I (11.2 gm. of petroleum sodium sulfonate; 2.2% by weight of the broth), the solution being first adjusted to pH 2 with hydrochloric acid. The resulting solvent extract, amounting to about 120 ml. is adjusted to pH 6.8 with an aqueous solution of sodium bicarbonate and extracted with 25 ml. of water. The aqueous extract is found to have a potency in excess of 2000 mcg./ml. of 6-aminopenicillanic acid.

Example 9

A 500 ml. portion of a filtered broth having a potency of 290 mcg./ml. (by bioassay) of 6-aminopenicillanic acid is adjusted to pH 2 and extracted with a solution containing 125 ml. of n-butanol and 10 gm. of Petroleum Sodium Sulfonate Mixture No. I (6.2 gm. of petroleum sodium sulfonate; 1.2% by weight of the broth), the solution being first adjusted to pH 2 with sulfuric acid. The spent aqueous broth is found to have a potency of 190 mcg./ml. The resulting butanolic extract, amounting to 107 ml. and having a potency of about 800 mcg./ml., is adjusted to pH 6.8 with an aqueous solution of sodium hydroxide and extracted with 25 ml. of water. The aqueous extract is found to have a potency of 2000 mcg./ml. of 6-aminopenicillanic acid.

While in the foregoing specification various embodiments of this invention have been set forth and specific details thereof elaborated for the purpose of the illustration, it will be apparent to those skilled in the art that this invention is susceptible to other embodiments and that many of these details can be varied widely without de-

We claim:
1. A process comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of an organic solvent selected from the group consisting of the substantially water-immiscible alcohols having the formula ROH wherein R is an alkyl group having from 4 to 6 carbon atoms, the substantially water-immiscible esters having the formula $R^1COOR^2$ wherein $R^1$ and $R^2$ are each alkyl groups having from 1 to 6 carbon atoms and wherein the total number of carbon atoms in each of said esters is from 4 to 8, the substantially water-immiscible ketones having the formula

wherein $R^3$ and $R^4$ are each alkyl groups having from 1 to 6 carbon atoms and wherein the total number of carbon atoms in each of said ketones is from 4 to 8, and the substantially water-immiscible ethers having the formula $R^5-O-R^6$ wherein $R^5$ and $R^6$ are each alkyl groups having from 3 to 6 carbon atoms, said organic solvent having dissolved therein from about 0.5% to about 10% by weight of said aqueous solution of a member selected from the group consisting of the compounds having the formula $(RSO_3)_xM$ wherein R is a hydrocarbon radical having a molecular weight of at least about 340 and not more than about 425, wherein M is selected from the group consisting of hydrogen and the alkali metals and the alkaline earth metals, and wherein $x$ is the valence of M and mixtures thereof; and separating the aqueous phase from the organic solvent phase containing the major portion of the 6-aminopenicillanic acid originally dissolved in said aqueous solution of 6-aminopenicillanic acid.

2. A process comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of an organic solvent selected from the group consisting of the substantially water-immiscible alcohols having the formula ROH wherein R is an alkyl group having from 4 to 6 carbon atoms, the substantially water-immiscible esters having the formula $R^1COOR^2$ wherein $R^1$ and $R^2$ are each alkyl groups having from 1 to 6 carbon atoms and wherein the total number of carbon atoms in each of said esters is from 4 to 8, the substantially water-immiscible ketones having the formula

wherein $R^3$ and $R^4$ are each alkyl groups having from 1 to 6 carbon atoms and wherein the total number of carbon atoms in each of said ketones is from 4 to 8, and the substantially water-immiscible ethers having the formula $R_5-O-R_6$ wherein $R_5$ and $R_6$ are each alkyl groups having from 3 to 6 carbon atoms, said organic solvent having dissolved therein from about 0.5% to about 10% by weight of said aqueous solution of a petroleum sulfonate selected from the group consisting of the petroleum sulfonates having the formula $(C_nH_{2n-10}SO_3)_xM$ wherein M is selected from the group consisting of hydrogen, the alkali metals and the alkaline earth metals, wherein $x$ is the valence of M and wherein $n$ is a whole number not less than about 25 and not greater than about 32, and mixtures thereof; and separating the organic solvent phase containing the major portion of the 6-aminopenicillanic acid originally dissolved in said aqueous solution of 6-aminopenicillanic acid.

3. A process for concentrating aqueous solutions of 6-aminopenicillanic acid comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of n-butanol containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the butanolic phase from the aqueous phase; and extracting the butanolic phase with a lesser volume of water at a pH of from about 5 to 8 whereby a concentrated aqueous solution of 6-aminopenicillanic acid is obtained.

4. A process for concentrating aqueous solutions of 6-aminopenicillanic acid comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of methyl isobutyl ketone containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the solvent phase from the aqueous phase; and extracting the solvent phase with a lesser volume of water at a pH of from about 5 to 8 whereby a concentrated aqueous solution of 6-aminopenicillanic acid is obtained.

5. A process for the recovery of 6-aminopenicillanic acid from aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of n-butanol containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the butanolic phase from the aqueous phase; extracting the butanolic phase from the aqueous phase; extracting the butanolic phase with a lesser volume of water at a pH of from about 5 to about 8 whereby a concentrated aqueous solution of 6-aminopenicillanic acid is obtained; and recovering crystalline 6-aminopenicillanic acid from said concentrated aqueous solution of 6-aminopenicillanic acid.

6. A process for the recovery of 6-aminopenicillanic acid from aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of methyl isobutyl ketone containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the solvent phase from the aqueous phase; extracting the solvent phase with a lesser volume of water at a pH of from about 5 to 8 whereby a concentrated aqueous solution of 6-aminopenicillanic acid is obtained; and recovering crystalline 6-aminopenicillanic acid from said concentrated aqueous solution of 6-aminopenicillanic acid.

7. A process for the recovery of 6-aminopenicillanic acid from aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about one to 3 with a lesser volume of methyl isobutyl ketone containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the solvent phase from the aqueous phase; adjusting said solvent phase to a pH of from about 3 to about 5.5 whereby crystalline 6-aminopenicillanic acid is precipitated; and separating the crystalline 6-aminopenicillanic acid from said solvent phase.

8. A process for the recovery of 6-aminopenicillanic acid from aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1 to 3 with a lesser volume of n-butanol containing from about 0.5% to about 10% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the solvent phase from the aqueous phase; adjusting said solvent phase to a pH of from about 3 to about 5.5 whereby crystalline 6-aminopenicillanic acid is precipitated; and separating the crystalline 6-aminopenicillanic acid from said solvent phase.

9. A process for the recovery of 6-aminopenicillanic acid from aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 1.5 to 2.5 with a lesser volume of n-butanol containing from about 1% to about 7.5% by weight of said aqueous solution of a petroleum sulfonate selected from the group of compounds having a molecular weight of about 490 to 510 and having the formula $RSO_3Na$ wherein R is a monovalent unsaturated hydrocarbon radical having from about 28 to 30 carbon atoms, and mixtures thereof; separating the solvent phase from the aqueous phase; adding an aqueous solution of sodium hydroxide to said solvent phase to bring the pH thereof to within the range of from about 4.0 to 4.5; and recovering solid 6-aminopenicillanic acid from the resulting two-phase solution.

References Cited in the file of this patent

UNITED STATES PATENTS

| | | |
|---|---|---|
| 2,562,715 | Heathcote et al. | July 31, 1951 |
| 2,563,779 | Finn | Aug. 7, 1951 |
| 2,941,995 | Doyle et al. | June 21, 1960 |

FOREIGN PATENTS

| | | |
|---|---|---|
| 569,728 | Belgium | Nov. 15, 1958 |
| 606,940 | Great Britain | Aug. 23, 1948 |